United States Patent [19]

Goldstein et al.

[11] Patent Number: 4,767,640

[45] Date of Patent: Aug. 30, 1988

[54] LIGHT STABLE HOP EXTRACTS AND METHOD OF PREPARATION

[75] Inventors: Henry Goldstein; Patrick L. Ting, both of Brookfield; Etzer Chicove, Milwaukee; Gary Goetzke, New Berlin; John M. Cowles, Whitefish Bay, all of Wis.

[73] Assignee: Miller Brewing Company, Milwaukee, Wis.

[21] Appl. No.: 48,081

[22] Filed: Apr. 11, 1987

Related U.S. Application Data

[63] Continuation-in-part of Ser. No. 792,340, Oct. 29, 1985, abandoned.

[51] Int. Cl.[4] .................................................. C12C 3/00
[52] U.S. Cl. ..................................... 426/600; 426/592; 426/651
[58] Field of Search ............... 426/592, 600, 651, 431, 426/16

[56] References Cited

U.S. PATENT DOCUMENTS

| | | | |
|---|---|---|---|
| 3,044,879 | 7/1962 | Koch et al. | 99/50.5 |
| 3,558,326 | 1/1971 | Westermann et al. | 99/50.5 |
| 3,949,092 | 4/1976 | Mitchell | 426/16 |
| 4,212,895 | 7/1980 | Laws et al. | 426/600 |
| 4,298,626 | 11/1981 | Laws et al. | 426/600 |
| 4,324,810 | 4/1982 | Goldstein et al. | 426/600 |
| 4,338,348 | 7/1982 | Müller | 426/600 |
| 4,342,791 | 8/1982 | Baker | 426/600 |
| 4,666,731 | 5/1987 | Todd | 426/600 |

*Primary Examiner*—R. B. Penland
*Attorney, Agent, or Firm*—Quarles & Brady

[57] ABSTRACT

A method of preparing anactinic hop extracts comprising three stages: pre-purification of a liquid $CO_2$ hop extract using liquid-liquid extraction to isolate pure humulones or alpha acids; isomerization/reduction of the humulones to obtain a mixture consisting of reduced isohumulones and non-isohumulone light unstable products (NILUPS); then adding alkali and water to the mixture of reduced isohumulones and NILUPS, heating and stirring to extract the reduced isohumulones into an aqueous phase and to leave the NILUPS in an oil phase. The aqueous phase is an anactinic hop extract which can be used to prepare light stable malt beverages.

4 Claims, No Drawings

LIGHT STABLE HOP EXTRACTS AND METHOD OF PREPARATION

RELATED CASE

This application is a continuation-in-part of our earlier U.S. patent application Ser. No. 792,340 filed Oct. 29, 1985, now abandoned.

FIELD OF THE INVENTION

The present invention generally relates to hop extracts for use in flavoring malt beverages. More particularly, it relates to novel light stable hop extracts and a method of preparing such extracts.

BACKGROUND OF THE INVENTION

Hops, in the form of either the ground dried plant or an extract, are used in brewing to give malt beverages, such as beer or ale, their characteristic bitter flavor and pleasant aroma. The hops or a hop extract may be added to boiling wort in the brew kettle. An isomerized hop extract, if it is highly purified, may be added post kettle, i.e., after the wort has been boiled or after fermentation. The primary hop constituents used in the brewing process are the alpha acids, the beta acids, the uncharacterized soft resins and the hop oils. The alpha acids are known as humulones and the beta acids are known as lupulones. The alpha acids are the precursors of the bitter substances in beer. The beta acids or lupulones have low solubility in kettle wort and beer and play a relatively minor role in the brewing process.

During brewing, chemical changes are made in the humuones resulting in the formulation of compounds known as iso-alpha acids, i.e., isohumulone, isocohumulone and isoadhumulone. These iso-alpha acids are formed in the kettle during the kettle boil in the normal brewing process and are the primary contributors to the characteristic bitter flavor of beer and ale.

Hop extracts have been used in brewing beer for a number of years. The reasons are several fold. When whole hops are added to the kettle, the yield of isohumulone is poor, e.g., 20–25% based on the humulone present in the hops. However, the conversion of humulones in a hop extract to isohumulones can be very high, e.g. 80%. Furthermore, the utilization of the pure isohumulones in a pre-isomerized extract which is added post kettle is known to be extremely high, e.g. 70-90%.

In order to use a hop extract post kettle, it must contain isohumulones of a high degree of purity. It should not contain hop components such as lupulones, waxes and other insoluble residues which can cause substantial haze, i.e., turbidity or gushing, i.e., rapid carbon dioxide release.

Extracts containing isohumulones of only 80% purity, for example, cannot be added post kettle in amounts exceeding approximately 10–15 ppm of isohumulone without the possibility of causing turbidity in the finished product. On the other hand, extracts containing isohumulone of high purity, $\geq 90\%$ for example, can be added post kettle at levels exceeding 20 ppm without a significant increase in turbidity.

It is known that isohumulone derived from hops or an unreduced hop extract can cause light instability in malt beverages. The exposure of such a beer or ale to light can result in the beverage becoming "light struck" and having a skunky odor.

For many years researchers have been striving to produce an anactinic or light stable hop extract.

In Koch et al., U.S. Pat. No. 3,044,879, a method for the isomerization and reduction of alpha acids to produce reduced isohumulones is disclosed and in the Westermann et al., U.S. Pat. No. 3,558,326, a method is disclosed for the production of a post-kettle additive and a kettle additive.

The hopping materials produced by the methods of the Koch et al. and Westermann et al. patents gave a product which produced beers that were far better with respect to light stability than beers produced with unreduced isohumulone (conventional beers). However, a significant residual light instability remained which was attributed to residual unreduced isohumulone.

Subsequently, with the development of high performance liquid chromatography (HPLC) techniques for the analysis of unreduced isohumulone in reduced hop extracts, it was possible to tell that products produced by the dual-phase isomerization/reduction methods of Koch et al. and Westermann et al. contained anywhere from 2–5% unreduced isohumulone (based on total isohumulones present).

In the Goldstein et al. U.S. Pat. No. 4,324,810, a method is disclosed for making an anactinic hop kettle additive and a purified anactinic post-kettle additive without the use of organic solvents. This single phase isomerization and reduction process was carried out at 60°–65° C. (similar to the prior art); the product still contained 1–3% unreduced isohumulone based on the total isohumulones present. The starting material for the process reported in Goldstein et al. was a liquid carbon dioxide hop extract containing alpha acids, beta acids, hop oils, and waxes.

Research subsequent to the Goldstein et al. patent found that the amount of unreduced isohumulone could be brought below the detection limit of the HPLC technique (0.5% unreduced isohumulones based on the total isohumulones) by carrying out the isomerization/reduction at higher temperatures (80°–100° C.). Although beers produced with these hop extracts containing less than 0.5% unreduced isohumulones were more light stable than those made with extracts produced by the dual phase methods (containing from 2–5% unreduced isohumulones) or by the low temperature single phase method, analyses by both sensory and chromatographic techniques surprisingly indicated that a residual light instability was still present.

It was theorized that the residual light instability in the single phase products might be due to one of the following:

1. The analytical techniques for the estimation of unreduced isohumulone in the hop extracts were not giving reliable readings and there was, in fact, more than 0.5% unreduced isohumulone present in these extracts.

2. Compounds other than the unreduced isohumulones were precursors of 3-methyl-2-butene-1-thiol (which is the malodorous end-product of the light-induced reaction and is the immediate cause of "light struck" aroma) and were the underlying cause of the light instability.

3. High levels of reduced isohumulone caused light instability.

4. Reduced isohumulone was oxidized to isohumulone before or after addition to beer. This re-formed isohumulone caused the light instability.

Subsequent research showed that the cause of light instability in beer bittered with extracts produced by the high temperature single phase method was due to compounds other than unreduced isohumulones (theory 2). Briefly, it was shown that there was very little or no residual 3-methyl-2-butene-1-thiol, the chemical responsible for the "skunky" odor, detected (either by sensory or analytical methods) when pure crystalline unreduced trans-isohumulone was added to beer at levels equivalent to or less than 0.5% (based on total isohumulones). In addition, attempts to oxidize reduced isohumulone under brewing conditions met with failure. Furthermore, although it was shown experimentally that beers bittered with reduced isohumulone could yield 3-methyl-2-butene-1-thiol under conditions of high intensity ultraviolet irradiation in quartz vessels, this reaction did not occur when using visible light in flint glass containers.

We believe that there may be some non-isohumulone light unstable products (NILUPS) in the hop extracts which are the cause of the residual light instability.

It has been well established in the literature that the enclosed side chain containing carbonyl number 1 and a non-conjugated double bond (See Diagram) must be intact for 3-methyl-2-butene-1-thiol formation (under conditions of visible light in a flint glass container) and the condition (degree of reduction-oxidation) of carbonyls numbers 2, 3, or enol 4 would not directly affect light stability The NILUPS described above still contain the unreduced carbonyl 1 and the non-conjugated double bond; compounds containing this moiety are the cause of the light instability found in products brewed with hop extracts made by the single-phase high temperature isomerization/reduction of isohumulone.

We do not know with certainty which light unstable compounds are present or how they might be formed. However, as can be seen in the diagram, isohumulones can exist in two geometric forms, cis and trans. The aqueous alkaline reduction of carbonyl 1 in trans-isohumulone proceeds at a much lower rate than the same reduction of carbonyl 1 in cis-isohumulone. The lower reduction rate of trans-isohumulone explains the incomplete reduction of carbonyl 1, which could be responsible for products that are light sensitive.

DIAGRAM

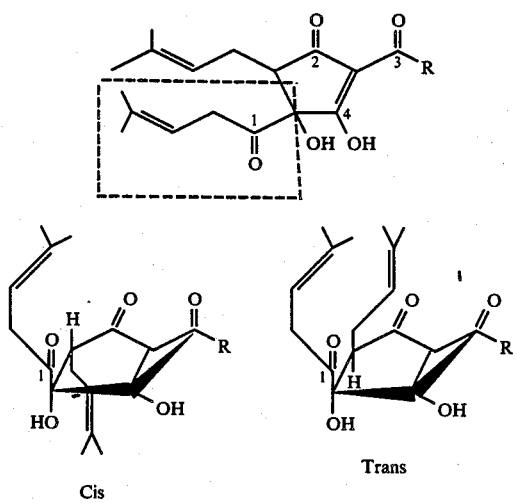

Cis    Trans

Another possible cause of inhibition of reduction of the carbonyl 1 is a side reaction involving the other carbonyls. If any or all of these carbonyl groups are reduced to secondary alcohols, for example, the $pK_a(s)$ of the resulting compound(s) would be higher than the reactant (isohumulone) or for that matter reduced isohumulone. This decrease in acidity would lower the solubility of the resulting compound(s) in alkaline sodium borohydride (depending on the pH of that solution) due to a shift in the free acid- "salt" equilibrium. Lower solubility would cause a further decrease in the reduction rate of carbonyl 1. It is well documented in the literature that the reduction of one of the carbonyl groups (2–4) would also cause a red shift in the UV absorption maximum from approximately 250 nm to approximately 280 nm (in alkaline methyl alcohol). Small amounts of these compounds can be detected by HPLC with UV detection at 280 nm but not at 254 nm, the wavelength commonly used for this procedure.

The solubility of these compounds (NILUPS) in beer would be similar to that of reduced isohumulone. Therefore, their effect on light stability would be comparable to that of unreduced isohumulone since the side chain containing carbonyl 1, the enclosed side chain, is still intact.

In an attempt to push the isomerization/reduction reaction to completion (high temperature reaction) i.e. produce a product with only reduced isohumulone and no unreduced isohumulone, we have instead surprisingly produced a hop extract that contains no unreduced isohumulone (below the HPLC detection limit), but a small amount of NILUPS. Unlike unreduced isohumulone, NILUPS have a different $pK_a$ than reduced isohumulone; separation of the NILUPS from the desired product by careful adjustment of pH is therefore possible.

SUMMARY OF THE INVENTION

The primary objects of the present invention are to disclose both novel light stable hop extracts and a novel and efficient process of preparing such extracts.

The method of the present invention comprises preparing light-stable hop extracts from a purified hop extract which consists essentially of reduced isohumulones and non-isohumulone light unstable products (NILUPS). The preferred method comprises three stages: pre-purification of a liquid $CO_2$ hop extract using liquid-liquid extraction to isolate pure humulones or alpha acids at a pH of about 8 to about 9; isomerization/reduction of the solution of humulones using caustic sodium borohydride at a temperature of about 80° to about 100° C. to obtain a mixture consisting of reduced isohumulones and non-isohumulone light unstable products (NILUPS); and the separation of the reduced isohumulones from the NILUPS by carefully adjusting the pH by adding alkali and water to the hop extract, heating and stirring the resulting mixture at about 40° C. to about 80° C. to extract the reduced isohumulones into an aqueous lower phase having a final pH of about 6.0 to about 7.5 and to leave the non-isohumulone light unstable products in an oily upper phase, and then isolating the aqueous phase which contains the desired light stable hop extract from the oily phase. Separation of the aqueous and oily phases can be accomplished with or without the aid of a water immiscible solvent.

DESCRIPTION OF THE PREFERRED EMBODIMENT

The preferred process involves three stages. The first stage is a pre-purification of a carbon dioxide hop extract using liquid-liquid extraction to isolate the humulones or alpha acids. The second stage is an isomerization/reduction at 80°–100° C. of humulones to obtain a mixture consisting essentially of reduced isohumulones and a small amount of non-isohumulone light unstable products (NILUPS). The third and last stage separates the reduced isohumulones from the NILUPS; the separation comprises adding alkali and water to the mixture of the second stage to attain an exact pH range, heating the mixture to solubilize the reduced isohumulones to extract them into the aqueous phase and then separating the desired aqueous phase from the oil phase which contains the light unstable products (NILUPS).

In the first stage, preferably, one volume of whole $CO_2$ hop extract is combined with one equivalent of potassium hydroxide (or sodium hydroxide) per equivalent of humulones or alpha acids and two volumes of water. The mixture is stirred at temperatures between 45° C. and 65° C. for 5 to 15 minutes and the aqueous solution of the alpha acids is separated from the oil layer by gravity. The oil layer contains a small amount of alpha acids, and all the beta acids, hop oils, waxes, etc. originally present in the whole $CO_2$ extract.

In the second stage, the aqueous alpha acid or humulone solution is stirred with a 1.0 to 1.2 molar excess of sodium hydroxide and 0.4 to 0.75 moles of sodium borohydride per mole of alpha acids at 80° C. for 2–3 hours. Acidification and separation produces an oily product containing reduced isohumulones, a small amount of humulinic acid, low UV background (side products, $\lambda_{max.}=275-285$ nm in alkaline methyl alcohol), and less than 0.5% unreduced isohumulones based on total isohumulones present. Low levels of NILUPS are also present in this material.

In the third step, an aqueous alkali solution is added to the oily product obtained above and the mixture stirred at 50°–65° C. to extract (or solubilize) the reduced isohumulones into the aqueous phase whose final pH is between about 6.8 and about 7.2, and to leave the NILUPS behind in the oil phase.

The practice of the present invention is further illustrated by the examples which follow:

EXAMPLE 1

(Stages 1 and 2)

To 100 g of a carbon dioxide hop extract containing 37.63 g alpha acids, 22.03 g beta acids and 12.53 g UV background material was added 17.3 ml of 6.0 N sodium hydroxide and 200 ml of water. The mixture was stirred at 50°–55° C. for 15 minutes and the aqueous solution of alpha acids was separated from the oil layer by gravity. The aqueous phase was found to contain 12.8% alpha acids, 0.97% UV background material and trace amounts of beta acids. The final pH of this solution was 8.4. The recovery of alpha acids for this process was 73%; the alpha acids obtained were greater than 90% pure. The alpha acids in 70 g of the above aqueous solution were isomerized and reduced employing 0.70 g of sodium borohydride and 26 ml of 1.0N sodium hydroxide at 80° C. for 3 hours. After acidification, the top layer, a yellow oil, was separated from the lower aqueous layer by gravity at 55° C. The analytical results indicated that an extract containing 70% reduced isohumulone, 6.5% UV background material and less than 0.5% unreduced isohumulone was obtained.

EXAMPLE 2

(Stages 1 and 2)

A whole carbon dioxide hop extract (68.4 lbs) containing 34.1 lbs of alpha acids and 20.9 lbs of beta acids was mixed with 135 lbs of water and 3.54 liters of 45% potassium hydroxide. The mixture was agitated at 125° F. for 5 minutes. The aqueous phase was separated from the oil phase; it weighed 168.75 lbs and contained 16.8% alpha acids, 0.5% beta acids and 0.2% UV background. The above aqueous solution was isomerized and reduced employing 2.0 liters of 50% aqueous sodium hydroxide (1.0 mole sodium hydroxide to 1.0 mole of alpha acids) and 1.4 lbs of sodium borohydride (0.5 mole sodium borohydride to 1 mole of alpha acids). The reduction was carried out at 175° F. for 2 hours. After acidification the upper oil layer which weighed 28.7 lbs was separated from the acidic aqueous layer by gravity and analyzed by ultraviolet spectroscopy. The analytical results indicated that this layer contained 89% reduced isohumulone, 3.2% beta acids and 4.3% UV background material. The product obtained was converted into an aqueous potassium salt solution (34–45% concentration) and was used as a post-kettle additive for beer. Beer brewed with this extract, however, exhibited residual light instability.

The purified hop extracts (oily layers) of Examples 1 and 2 were fractionated using the pH partitioning method of the present invention (Example 3); an alternative separation method involved column chromatography (Example 4).

The purification method of the present invention employed a careful titration or pH partitioning. Most of the pure reduced isohumulone contained in the products of Examples 1 and 2 dissolved in the aqueous phase using alkaline extraction at a pH from 6.0 to 7.5 and a diluent ratio range of from 6 to 10:1 (w/w) aqueous solution to extract; an impure material containing reduced isohumulone (50%), UV background (45%) and beta acids (11%) remained in the oil phase. This separation technique provides the basis for the post-purification process of the present invention.

In the chromatographic method the oil layers were separated on buffered silica gel and eluted with ethyl acetate/hexane. Three fractions were obtained; analysis by UV spectroscopy gave the gross composition of each fraction. The first fraction consisted of reduced isohumulone (72%), UV background material (34%) and beta acids (9%); the second fraction was pure reduced isohumulone; and the third fraction consisted of 72% reduced isohumulone and 21% UV background. High performance liquid chromatography indicated that both fractions 1 and 3 contained several compounds whose absorption was stronger with detection at 280 nm than with detection at 254 nm. This separation was accomplished using typical organic laboratory techniques and was for analytical purposes only.

EXAMPLE 3

(Stage 3)

A mixture containing 5 g of the oil layer of Example 1, 300 ml of warm water and 115 ml of 1.0N KOH was heated with agitation at 50°–65° C. for 1 hour. The aqueous phase (pH 7) contained pure reduced isohumulone and was separated from the oily residue (impure material) by decantation at 20° C.; it was then acidified with 50% sulfuric acid. The newly-formed oil phase which was formed was separated by gravity from the resulting aqueous acidic phase. The oil phase contained 28 g (64% yield) of reduced isohumulones free of non-isohumulone light unstable products (NILUPS). This product was converted into an aqueous potassium salt solution containing 30–40% solids and was added to beer (post-kettle).

EXAMPLE 4

(Analytical Confirmation)

Buffered silica gel was prepared by treating silica gel with a 0.1M citric acid solution brought to a pH of 3 with sodium citrate. Removal of the aqueous buffer and drying provided the stationary phase for the chromatographic separation described herein. A sample containing 10.5 g of the oily product of Example 1 in 8% ethyl acetate/hexane was chromatographed and eluted sequentially with 8%, 15% and 50% ethyl acetate/hexane. Three fractions were obtained and analyzed by UV spectroscopy a described above.

EXAMPLE 5

Five fractions (the post purified aqueous phase of Example 3, the post-purified oil phase of Example 3, the first liquid chromatography (LC) fraction of Example 4, the second LC fraction of Example 4 and the third LC fraction of Example 4) of the oil layer of Example 1 were added to unhopped beers to prepare Pilot Beers 1 through 5. All samples were packaged in flint glass bottles. An unhopped control was also included (Pilot Beer 6). The samples were arranged horizontally in a light box and irradiated for 2 hours with 600 foot-candles of fluorescent light. The gas chromatographic analyses for 3-methyl-2-butene-1-thiol are summarized in Table 1. The same pilot brews and an unhopped control beer were also evaluated for light stability under less harsh supermarket conditions; the test was conducted over a 20 day period and samples were placed in open six pack carriers under 25 foot-candles of fluorescent light. Samples were tested against an unexposed control employing the QDA method on a 24-point scale (low ratings have less lightstruck character). The beer formulated with pure reduced isohumulone obtained from the aqueous phase from the pH partitioning method (Example 3) and that formulated with pure reduced isohumulone (second LC fraction from Example 4) remained light stable throughout the 20 day period. All other exposed samples developed a significant amount of lightstruck character. The results of this test are also summarized in Table 1. The purified fractions free of non-isohumulone light unstable products (NILUPS) provided beer with far greater light stability than beers bittered with hop extracts produced by any other method.

It will be apparent to those skilled in the art that the method of the present invention, in addition to being novel and useful, is also unobvious as it results in the production for the first time of hop extracts which are free of both isohumulones and non-isohumulone light unstable products. This extract can be used to prepare light stable malt beverages that could not be made with prior art hop extracts. The method is also safe, simple and economical. For example, no undesirable organic solvents are used and only conventional separation techniques and equipment are employed.

TABLE 1

| Fraction | Sample | Rho-Isohumulone Purity | Pilot Brew | B.U. | QDA Score | 3-Methyl-2-Butene-1-Thiol(ppt) |
|---|---|---|---|---|---|---|
| 1 | Post Purified Aqueous Phase | 100% | 1 | 13.5 | 5.4 | none detected |
| 2 | Post Purified Oil Phase | 50% | 2 | 10.5 | 8.3 | 14 |
| 3 | LC - Impure Fraction | 72% | 3 | 12.0 | 9.7 | none detected |
| 4 | LC - Pure Fraction | 95% | 4 | 13.8 | 6.2 | none detected |
| 5 | LC - Impure Fraction | 73% | 5 | 11.8 | 10.2 | 23 |
| 6 | None | — | 6 | — | 7.2 | — |

It also will be apparent to those skilled in the art that a number of modifications and changes may be made without departing from the spirit and scope of the invention. Therefore, it is to be understood that the invention is not to be limited by the description and examples but only by the claims which follow:

We claim:

1. A method of preparing a hopping preparation of superior light stability from a hop product consisting essentially of reduced isohumulones, less than about 0.5% unreduced isohumulones and non-isohumulone light unstable products, said method comprising adding an effective amount of aqueous alkali to the hop product to adjust the final pH to about 6.0 to about 7.5; heating the resulting mixture of about 40° C. to about 80° C. for about one hour to form an aqueous phase containing the reduced isohumulones and unreduced isohumulones and an oil phase containing the non-isohumulone light unstable products; and then, isolating the aqueous phase which is a hopping preparation of superior light stability.

2. A method of claim 1 in which the aqueous alkali is potassium hydroxide solution.

3. A method of claim 1 in which the heating is done at about 50° C. to about 65° C.

4. A hopping preparation, free of non-isohumulone light unstable products, when prepared by the method of claim 1.

* * * * *